United States Patent [19]

Boyle et al.

[11] Patent Number: 4,874,606

[45] Date of Patent: Oct. 17, 1989

[54] RAPID REHYDRATING BEVERAGE

[75] Inventors: Peter C. Boyle, Princeton, N.J.; Daniel G. Steffen, East Windsor, N.J.; John L. Melton, Bordentown, N.J.; Gus D. Coccodrilli, Jr., Yorktown Heights, N.Y.; Michael A. Nagy, Hightstown, N.J.

[73] Assignee: General Foods Corp., White Plains, N.Y.

[21] Appl. No.: 889,047

[22] Filed: Jul. 23, 1986

Related U.S. Application Data

[63] Continuation-in-part of Ser. No. 677,937, Dec. 14, 1984, abandoned.

[51] Int. Cl.$^4$ .................................................. A23L 2/00
[52] U.S. Cl. ..................................... 426/74; 424/680; 424/679; 426/548; 426/590; 514/23; 514/474; 514/784
[58] Field of Search ................. 426/74, 590, 548, 648, 426/649, 806, 810; 424/153, 149; 514/23, 784, 474

[56] References Cited

U.S. PATENT DOCUMENTS

| | | | |
|---|---|---|---|
| 2,224,252 | 12/1940 | Callaway | 426/590 |
| 3,676,553 | 7/1972 | Reynolds | 424/128 |
| 3,800,046 | 3/1974 | Schlatter | 426/590 |
| 4,042,684 | 8/1977 | Kahm | 426/590 |
| 4,322,407 | 3/1982 | Ko | 424/128 |
| 4,508,740 | 4/1985 | McSweeney | 426/548 |
| 4,547,384 | 10/1985 | Kryger | 426/548 |
| 4,551,342 | 11/1985 | Nakel et al. | 426/548 |
| 4,592,909 | 6/1986 | Winer et al. | 424/149 |
| 4,619,833 | 10/1986 | Anderson | 426/548 |

*Primary Examiner*—Donald E. Czaja
*Assistant Examiner*—Carolyn Paden
*Attorney, Agent, or Firm*—Thomas R. Savoie; Daniel J. Donovan

[57] ABSTRACT

A flavored and sweetened aqueous beverage which rapidly rehydrates dehydrated individuals, containing specified amounts of water, sodium chloride, citric acid and APM.

10 Claims, No Drawings

RAPID REHYDRATING BEVERAGE

This is a continuation-in-part of Ser. No. 677,937, filed Dec. 14, 1984 and now abandoned.

TECHNICAL FIELD

This invention relates to a beverage which increases the rate of gastric emptying and is useful in rapidly rehydrating dehydrated individuals.

BACKGROUND ART

It is well-known that increased physical exertion, particularly in hot and/or humid environments, significantly reduces the level of various salts, particularly through perspiration. In order to replace the loss of fluids and salts in the body during exercise, various beverages have been developed.

U.S. Pat. No. 4,042,684 to Kahm, discloses a dietetic beverage containing sugar, sodium chloride, potassium chloride and citric acid for supplementing sugars and salts in a mammalian body, depleted thereof during vigorous physical exercise.

Epting, U.S. Pat. No. 4,448,770, discloses a dietetic beverage adapted for consumption by humans, to maintain the balance of body fluids during periods of fluid depletion. The beverage contains potassium ion, calcium ion, magnesium ion and sucrose, with each of the potassium, calcium and magnesium ions in the form of a soluble salt.

U.S. Pat. No. 4,592,909 to Winer et al., discloses a fluid replacement drink to replace electrolytes lost during periods of strenuous activity. The beverage companies water with very minor amounts of sodium, potassium, calcium and magnesium.

SUMMARY OF THE INVENTION

The present invention relates to a beverage which provides the much needed liquid and salt replenishment to a dehydrated body. In particular, it is addressed to those individuals exerting themselves in medium to heavy levels of exercise. It has been found that the addition of a specified level of L-aspartyl-L-phenyl-alanine methyl ester, hereinafter APM, actually increases the rate of gastric emptying over the rate of water alone. In addition to APM, this beverage includes levels of certain elements which the body also loses during periods of physical exertion, namely sodium, calcium, and potassium. In addition to increasing the rate of gastric emptying, APM also acts as a sweetening agent, so as to make the beverage more palatable. Although APM provides these two necessary functions, it is also necessary to include carbohydrates for energy, such as fructose and glucose.

The products within the scope of this invention may take a variety of forms. For instance, the product may be manufactured and sold as a single-strength beverage for direct consumption by the consumer. Alternatively, the product may be in the form of an aqueous concentrate or syrup which is diluted with water to yield a beverage which fulfills all the requirements of this invention. The product may also be in dry form, such as a powder or a tablet which is dissolved in water to yield the novel beverage of this invention.

DETAILED DESCRIPTION

An edible sodium salt, dissolved in a beverage, is present in an amount sufficient to provide from about 0.025 to about 0.042% by weight sodium, as based on the weight of the aqueous beverage, as consumed. The sodium may be added in the form of any convenient edible salt, such as sodium chloride. Sodium chloride is the preferred form, and is preferably present in the beverage in an amount of about 0.02 to about 0.06% by weight to provide part of the required sodium content.

Chloride ion is present in the beverage in an amount of about 0.01 to about 0.07% by weight, preferably, 0.025 to about 0.054%. Chloride ion may be conveniently provided in the form of the potassium or sodium salt. When chloride is included as sodium chloride, the amount of sodium chloride may be sufficient to supply both the sodium and chloride requirements. Otherwise, additional chloride or sodium salt, such as potassium chloride or sodium citrate may be used.

Citric acid or water-soluble salts thereof such as sodium or potassium citrate, are present in the beverage in an amount effective to provide 0.05 to 0.15% by weight citric acid. The citric acid is preferably added in as a salt and not as free citric acid, since the free acid tends to inhibit the emtpying of the stomach, a negative affect not experienced when a salt is used as the source of citric acid.

Incorporation of APM in the beverage has been found to increase the rate of gastric emptying, i.e., the rate at which a liquid empties from the stomach. The increase has been found to be in the range of from about 5 to about 10% of an emptying rate increase. The amount of APM to be used is from about 0.02 to about 0.06% by weight of the final product, preferably about 0.02 to about 0.04% APM.

In addition to APM, carbohydrate sweeteners are included at very low levels to provide energy. The level of the carbohydrates must be kept low due to the constraints on the beverage both in respect to solids content and carbohydrate content. Higher levels of either have been found to interfere with the rapidity of hydration. It has been found that fructose can be tolerated at levels of up to and including 5% by weight, with the preferable level of fructose being 2.0 to 3.5%. At those levels, fructose does not have a slowing effect on the rate of emptying. In addition, glucose may be added to the beverage at levels of from 0.9% to 1.8% with preferably 0.9%, the total amount of fructose and glucose never being greater than 5%. The preferred beverage contains 0.9% glucose and no fructose.

Conventional flavoring and coloring agents may be added as desired, subject only to the mentioned constraints on solids and carbohydrate content. There are many suitable water-soluble coloring and flavoring agents which can be used to provide beverages within these constraints, and it is a feature and advantage of the present invention that a wide variety of these conventional ingredients can be used to provide palatable beverages of wide variety. Suitable flavoring and coloring agents include those which are conventional in the aqueous beverage field and are used in amounts known to those skilled in the art.

EXAMPLE I

Dogs with chronically implanted gastric fistulae are given 300 mls of water or other beverage. After 15 minutes, the stomach is drained and rinsed. Gastric emptying is calculated as the difference in volume with corrections for gastric secretion by use of a marker. Emptying rate is expressed as percent emptied.

In multiple trials, dogs were given 300 mls of water and after 15 minutes the rate of gastric emptying was evaluated. Thereafter, the dogs were given 300 mls of either 0.02% or 0.04% APM solution. The effect of APM was judged by the difference between the average emptying rates of APM solutions and the average emptying rate of water, where each beverage was tested at least four times per day.

|  | % Emptied per 15 min. (mean ± SE) |
|---|---|
| $H_2O$ | 65.8 ± 2.4 |
| .02% APM | 73.3 ± 2.3 |
| .04% APM | 69.4 ± 2.5 |

Statistical test showed that both APM solutions emptied faster than water.

EXAMPLE II

Six dogs were tested following the procedure outlined above, in Example I. Five formulations were used, all each of variation of the present invention. Each beverage was tested at least 3 times per day.

| | Beverages, percent composition (grams/100 ml) | | | | |
|---|---|---|---|---|---|
| | B1 | B2 | B3 | B4 | B5 |
| Fructose | — | — | — | 2.0 | 2.0 |
| Glucose | 0.9 | 0.9 | — | — | — |
| NaCl | 0.03 | 0.03 | 0.03 | 0.03 | 0.03 |
| Na3 Citrate | 0.06 | 0.06 | 0.06 | 0.06 | 0.06 |
| K3 Citrate | 0.05 | 0.05 | 0.05 | 0.05 | 0.05 |
| CaCl2 | 0.025 | 0.025 | 0.025 | 0.025 | 0.025 |
| Citric Acid | 0.01 | 0.01 | 0.01 | 0.01 | 0.01 |
| APM | — | 0.02 | 0.02 | — | 0.02 |
| Emptied per 15 min. (mean + SE) | | | | | |
| B1 | 71.6 ± 1.5 | | | | |
| B2 | 69.9 ± 2.0 | | | | |
| B3 | 66.3 ± 2.7 | | | | |
| B4 | 72.5 ± 3.2 | | | | |
| B5 | 63.6 ± 2.6 | | | | |
| $H_2O$ | 65.8 ± 2.4 | | | | |

$B_1$, $B_2$ and $B_4$ emptied significantly faster than water. $B_3$, $B_5$ and water emptied similarly.

What is claimed is:

1. A flavored and sweetened aqueous beverage comprising:
   (a) water in an amount of at least 94.0% by weight;
   (b) sodium salt in an amount sufficient to provide about 0.025 to 0.042% by weight Na;
   (c) chloride salt in an amount sufficient to provide about 0.025 to 0.54% by weight chloride;
   (d) citric acid and/or citrate salts in an amount effective to provide about 0.05 to 0.15% by weight citric acid; and
   (e) about 0.02 to 0.06% by weight L-aspartyl-L-phenyl-alanine methyl ester.

2. A beverage according to claim 1 which further comprises about 0.9 to 1.8% glucose.

3. A beverage according to claim 1 which further comprises a flavoring agent.

4. A beverage according to claim 1 wherein the L-aspartyl-L-phenyl-alanine methyl ester is present at a level of 0.02 to 0.04% by weight.

5. A beverage according to claim 1 which further comprises about 0.012 to 0.020% by weight potassium.

6. A beverage according to claim 1 which further comprises about 0.005 to 0.015% by weight Ca.

7. A concentrate suitable for dilution with water to make the flavored and sweetened beverage as set forth in claim 1.

8. A concentrate according to claim 7 wherein water compresses up to 50% by weight of the concentrate.

9. A dry powdered mix suitable for dilution with water to make the flavored and sweetened beverage set forth in claim 1.

10. A tablet suitable for dilution with water to make the flavored and sweetened beverage set forth in claim 1.

* * * * *